INVENTORS
TOMMY DRISCOLL
HOMER RICHARDS

BY Wilson, Robbins & Anderson
ATTORNEYS

United States Patent Office 3,431,898
Patented Mar. 11, 1969

3,431,898
APPARATUS FOR USE WITH AN INTERNAL COMBUSTION ENGINE FOR REDUCING AIR POLLUTION
Tommy Driscoll, 23850 Crown Valley Road, Acton, Calif. 93510, and Homer Richards, 47527 N. 91st St., Lancaster, Calif. 93534
Filed Feb. 1, 1967, Ser. No. 613,337
U.S. Cl. 123—119          4 Claims
Int. Cl. F02m 25/06; B01d 29/00

ABSTRACT OF THE DISCLOSURE

A duct connecting the crankcase of an internal combuston engine to the combustion air-intake whereby noxious gases are withdrawn from the crankcase. The contaminants are trapped in a filter provided in the duct. Specifically, the filter comprises a transparent filter housing defining a frustum-shaped cavity containing a filter cartridge of cylindrical form and being a perforate or cellular resilient material, e.g. sponge rubber or plastic. The filter housing terminates in a cylindrical section which is keyed to receive an end closure that also serves to retain the filter cartridge.

Background of the invention

Live hydrocarbons constitute one of the most harmful components of the deadly smog which envelops many cities and industrial centers. Automobiles contribute a significant percentage of such live hydrocarbons in the form of fumes that are emitted from lubricants in engine crankcases. In the past, such fumes were permitted free escape to pollute the lower atmosphere; however, as the smog has intensified, various structures have been proposed for reducing or eliminating automobile-crankcase gases as a source of air pollution. Specifically, for example, it has been proposed to connect the crankcase cavity to the intake manifold of the engine, so that the pumping action of the pistons in the engine (drawing air into combustion chambers) also draws off noxious gases from the crankcase. In theory, the gases withdrawn from the crankcase in this manner are reduced by combustion within the engine to comparatively harmless gases. In fact, it has been determined that frequently, incomplete combustion of these gases in passing through the engine often converts them into even more noxious contaminants. The degree to which crankcase gases are reduced depends largely upon the condition of the engine, the operating temperature and a number of other factors. However, the incomplete combustion of crankcase gases is at best only a partial solution to the problem of air pollution.

The gases developed from the crankcase of an internal-combustion engine are generally heavy hydrocarbons. As a result, during combustion, these gases tend to form deposits of sludge and harmful carbon. Therefore, the pasage of such gases into the combustion chambers of an engine tends to adversely affect engine performance by producing undesirable carbon deposits. Specifically, crankcase fumes tend to deposit harmful carbon from the point of their injection all along the combustion flow path. Therefore, injecting crankcase gases into the upper passages of an engine, along with the combustion mixture adversely affects the engine performance in a progressive pattern of deterioration.

Summary

In view of the background situation, it is hereby proposed to trap heavy hydrocarbons from an internal-combustion engine crankcase in a disposable filter cartridge. In considering the problem of trapping such contaminants, it was proposed to place a filter in a duct connected between the crankcase and the engine air-intake. However, several special problems arose. Specifically, the problems which developed included: indicating the time for replacement of the cartridge; removing the cartridge without considerable labor; extending the useful life of the cartridge; and economically providing the filter structure. In general, these problems have been solved to a degree by providing a filter element that includes a transparent filter housing having an internal cavity of frustum shape to receive a resiliently-deformable cellular filter cartridge inserted through the large end of the cavity and similarly removable by disconnecting an end closure for the filter housing. Thus, various objects of a practical, economical and effective apparatus for trapping pollution ingredients carried from the crankcase are accomplished.

Brief description of the drawing

The drawing, discolsing an illustrative embodiment of the present invention to represent the various objects and advantages hereof sets forth as follows.

Detailed description of the illsutrative embodiment

Figure 1:
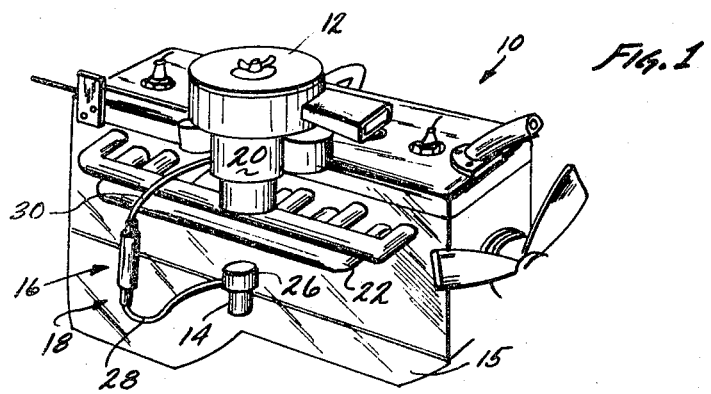
FIGURE 1 is a symbolic view illustratnig the application of the system hereof to an internal combustion engine.

Referring initially to FIGURE 1, there is shown a representation of an internal combustion engine 10, incorporating an air-intake through an air cleaner 12 and an oil-fill tube 14 for placing oil into the crankcase 15 (fragmentarily shown). The invention hereof in one embodiment involves a duct 16 connected to receive air-polluting gases from the crankcase of an engine. Specifically, gases are drawn from the tube 14 by the flow stream of air drawn through the air cleaner 12. The duct 16 incorporates a filter element 18 containing a replaceable cartridge, displayed for visual observation and held in such a manner that replacement is simple and easy.

Considering the structure as shown in FIGURE 1 in greater detail, the air cleaner 12 supplies clean air to a carburator 20 which also receives gasoline to be atomized into a highly-combustible mixture. The mixture is drawn into the cylinders of the engine 10 by the pumping action thereof, through an intake manifold, shown as 22, to be fired, driving the pistons. The waste products are then expelled from the engine through an exhaust manifold.

The oil-fill tube 14 provides a passage to the crankcase 15 of the engine 10 which contains a reservoir of lubricant, from which heavy gaseous hydrocarbon contaminants are developed. In accordance with widespread prior practice, these contaminants have been vented into the air through a breather tap 26 which closes the tube 14. In accordance herewith, those pollutants are drawn through a passage 28 in a gaseous form to be trapped in the filter element 18, which permits a substantially clean gas to flow through a passage 30 into the air stream provided through the air cleaner 12. This structure reduces the air contaminants produced by the engine 10, yet performance of the engine is not noticeably affected. Furthermore, as considered in detail below, the filter element 18 enables a substantially-uniform flow through the duct 16 and incorporates a filter element which is economical, effective and easy to change.

Figure 2:
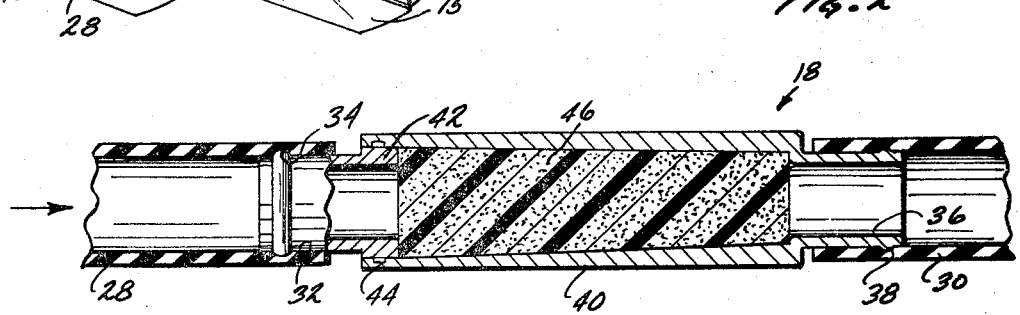
FIGURE 2 is a vertical sectional view taken through a portion of the structure represented in FIGURE 1, specifically a filter element thereof.

Considering the filter element in greater detail, reference will now be had to FIGURE 2 showing the filter element 18 as it is held between passages 28 and 30. The passages may comprise sections of flexible synthetic or natural tubing that is friction-fitted on to the filter structure. Specifically, the passage 28 is fixed over a cylindrical intake port 32 bearing an annular radially-extending ridge 34 to more effectively retain the hose or passage 28 telescopically affixed thereon. A similar arrangement provided at the outlet or exhaust passage 30 which is received upon a cylindrical port 36 having a ridge 38. The cylindrical port 36 is integrally formed with a generally cylindrical filter-housing body 40. Although the exterior of the body 40 is substantially cylindrical, the interior is frustum-shaped, i.e. internally tapering from intake to exhaust.

The exhaust end of the body 40, of reduced internal diameter is contiguous to the exhaust port 36 which provides an end closure for the body. The intake end of the body 40 receives an end closure 42 which is integral with the cylindrical port 32. The annulus of the circular closure 42 carries a pair of keys 44 which are received in open-channel circular keyways within the body 40 to lock the closure 42 in closing relationship to the body 40.

The frustum-shaped internal cavity of the body 40 contains a filter cartridge 46 which is formed of resiliently-deformable perforate material of cylindrical configuration. Specifically, for example, the cartridge 46 may comprise natural or synthetic sponge rubber or open-cell resiliently-deformable plastic materials, both of which have been found to function effectively. The cartridges may be cut or molded to shape in accordance with well-known production techniques.

In the manufacture of the apparatus hereof and specifically the exemplary disclosed embodiment, relatively inexpensive materials may be employed. Specifically, for example, the passages 28 and 30 may be formed of various flexible hose material some forms of which are in use for this connection. The enclosure 42 and the body 40 may be formed of plastic or other materials; however, it has been found very desirable to provide the body 40 of transparent or clear material. As a result, the cartridge element 46 can be frequently and conveniently observed visually, to determine whether or not it should be changed. Further, in this regard, it has been found desirable to form the cartridge 46 of light, e.g. white material so that the degree of contamination or amount of trapped sludge is readily apparent.

Installation of the apparatus hereof in each instance will depend upon whether or not a passage has been previously provided to carry gaseous contaminants from the crankcase to the internal combustion air stream of an engine. If such a passage has been provided, it may be necessary only to sever the hose or duct employed for this purpose, inserting the filter element 18 therein as shown in FIGURE 2. Alternatively, if the engine is not equipped with this passage, conventional hose or other duct material may be employed for the installation connections.

Figure 3:
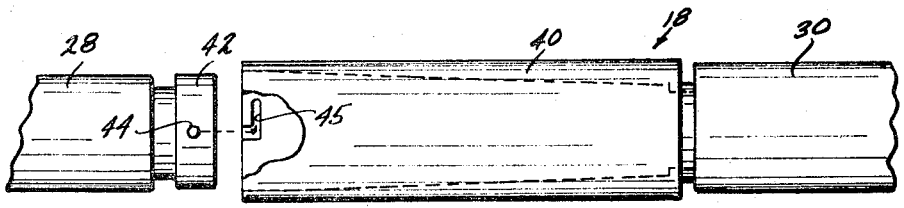
FIGURE 3 is a side view illustrating one stage of changing the cartridge in the filter of FIGURE 2.

After the installation is complete, the filter cartridge 46 (FIGURE 3) is inserted within the filter body 40. It is to be noted that the filter cartridge 46 is of generally cylindrical configuration and is of substantially greater axial length than the cavity within the body 40. However, as the cartridge is resiliently deformable it is simple and easy to compatibly insert it into the body 40. It is to be noted, that during the insertion the end of the cartridge 46 is somewhat compressed contiguous to the exhaust end of the filter body 40.

After placement of the cartridge within the body, the end closure 42 is telescopically fitted into the body 40 and the keys 44 urged into the keyways 45 and revolved to lock the closure 42 in place. Installation is now complete and the engine may be operated over a substantial interval during which gaseous contaminants developed within the crankcase are evacuated through the duct or passage 30 to be trapped in the cartridge 46.

It is to be noted that during the interval of use, which presumes intermittent operation of the internal combustion engine, the filter cartridge 46 may be periodically observed in conjunction with such operations as checking the oil level in the crankcase or other servicing and maintenance operations. Of course, as the contaminants are deposited in the filter cartridge, the cartridge darkens. It is to be noted that in the process of loading the cartridge with contaminants, a somewhat uniform deposition is accomplished by the internal taper imparted to the cartridge. That is, as the cartridge is tapered, the cellular passages therethrough become progressively smaller with the result that the loading of the cartridge by contaminants occurs by retention of progressively smaller particles, along the length of the cartridge.

Figure 4:
FIGURE 4 is another side view illustrating another stage of changing the cartridge in the filter of FIGURE 2.
Figure 4:
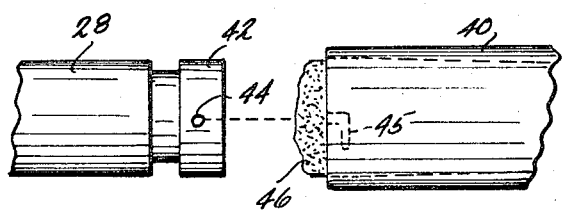

After the cartridge is substantially loaded, containing an amount of sludge which begins to impair the flow of gas therethrough, replacement is desirable. Thereupon, the end closure 42 is given a partial turn to disengage the keys 44 from the keyway 45 permitting the end closure to be withdrawn from the body 40. Thereupon the cartridge of the critical size and form as described "flows" in part out of the body 40. This operation is somewhat illustrated in FIGURE 4 wherein the cartridge 46 is shown to have partially emerged from the body 40 as a result of its resilient characteristic and the fact that it is "loaded" with contaminants. That is, upon removal of the end closure 42, the resiliently-deformable compressed cartridge which has become loaded with contaminants follows the end closure 42 so that a part of the cartridge 46 emerges freely from the open end of the body 40. As a result, the extending end of the cartridge 46 may be simply and easily grasped for withdrawal from the body 40. In general, it has been found that this characteristic of the apparatus is significantly improved with the internal taper of the body 40.

Upon removal of the loaded or contaminated cartridge, a "fresh" cartridge is simply slipped into the body 40 reconditioning the apparatus for re-use upon placement of the enclosure 42. In general, the effective period of the filter cartridge 40 depends largely upon the condition of the internal combustion engine and the manner in which itis operated. As a result, the need for transparency of the body 40 is quite significant.

From a consideration of the above exemplary embodimen several important features are readily apparent. For example, the unit is economical to manufacture and use, as well as being convenient and effective. Of course, other features and advantages hereof are also apparent, not only for the illustrative embodiment hereof but as may be attendant various other embodiments readily apparent to those skilled in the art. As a result, the scope hereof is not to be interpreted or limited by reference to the illustrative embodiment; rather shall be determined in accordance with the following claims.

What is claimed is:

1. In an internal combustion engine wherein an intake system provides air for combustion and including a crankcase having an at least partially-enclosed value of gas therein, the improvement which comprises:
   a filter housing defining an intake duct, an exhaust duct, and an internal chamber of frustum shape having reduced sectional area contiguous to said exhaust duct;
   a disposable filter cartridge adapted to be received in said filter housing, comprising an elongate cylindrical element having an axial length substantially greater than the axial length of said internal chamber;
   means connecting said intake duct to said crankcase to receive gas therefrom; and
   means connecting said exhaust duct to said intake system.

2. An improvement according to claim 1 wherein said filter cartridge comprises an open, porous resiliently-deformable element.

3. An improvement according to claim 1 wherein said filter housing is transparent whereby to reveal the degree of contamination.

4. An improvement according to claim 2 wherein said cartridge comprises resilient foam material of open cellular structure.

References Cited

UNITED STATES PATENTS

| | | | |
|---|---|---|---|
| 417,127 | 12/1889 | Williams | 210—497 X |
| 2,043,298 | 6/1936 | Markels | 55—505 X |
| 2,087,688 | 7/1937 | Johnson. | |
| 2,442,696 | 6/1948 | Krieck. | |
| 2,604,958 | 7/1952 | Leufvenius | 55—523 X |
| 2,910,717 | 11/1959 | Raymond | 55—521 X |
| 3,002,870 | 10/1961 | Belgarde et al. | |
| 3,145,697 | 8/1964 | Barr et al. | 123—119 |
| 3,263,402 | 8/1966 | Lindamood et al. | 123—119 X |
| 3,272,192 | 9/1966 | Jensen et al. | 123—119 |
| 3,224,118 | 12/1965 | Barlow | 123—119 X |

AL LAWRENCE SMITH, *Primary Examiner.*

U.S. Cl. X.R.

055—503, 505, 521